(12) United States Patent
Tripathi

(10) Patent No.: US 9,785,184 B2
(45) Date of Patent: *Oct. 10, 2017

(54) MAINTAINING SYNCHRONIZATION DURING VERTICAL BLANKING

(71) Applicant: Apple Inc., Cupertino, CA (US)

(72) Inventor: Brijesh Tripathi, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,424

(22) Filed: Aug. 24, 2015

(65) Prior Publication Data

US 2015/0362947 A1    Dec. 17, 2015

Related U.S. Application Data

(63) Continuation of application No. 13/717,978, filed on Dec. 18, 2012, now Pat. No. 9,116,639.

(51) Int. Cl.
*G06F 1/12* (2006.01)
*G09G 5/00* (2006.01)
*G09G 5/12* (2006.01)

(52) U.S. Cl.
CPC ............... *G06F 1/12* (2013.01); *G09G 5/006* (2013.01); *G09G 5/008* (2013.01); *G09G 5/12* (2013.01);
(Continued)

(58) Field of Classification Search
CPC ............... G06F 1/12; G09G 2330/021; G09G 2340/0435; G09G 2360/18;
(Continued)

(56) References Cited

U.S. PATENT DOCUMENTS 6,011,546 A    1/2000   Bertram
6,298,370 B1   10/2001  Tang et al.
(Continued)

FOREIGN PATENT DOCUMENTS

EP    2211510 B1   8/2011

OTHER PUBLICATIONS

International Search Report and Written Opinion from PCT/US2013/075665, mailed May 19, 2014, Apple Inc., pp. 1-11.
(Continued)

*Primary Examiner* — Thomas Lee
*Assistant Examiner* — Chad Erdman
(74) *Attorney, Agent, or Firm* — Meyertons, Hood, Kivlin, Kowert & Goetzel, P.C.

(57) ABSTRACT

Embodiments of an apparatus for implementing a display port interface are disclosed. The apparatus may include a source processor and a sink processor coupled through an interface. The interface may include a primary link, an auxiliary link, and a hot plug detect link. The source processor may be operable to send a wake-up command to the sink processor via the auxiliary link. The source processor may send initialization parameters to the sink processor via the primary link. The initialization parameters may include a clock data recovery lock parameter and an idle parameter. Following the initialization parameters, the source processor may send a synchronization signal to the sink processor via the primary link. The source processor may then send a sleep command via the primary link to the sink processor.

18 Claims, 9 Drawing Sheets

(52) U.S. Cl.
CPC ............... *G09G 2330/021* (2013.01); *G09G 2340/0435* (2013.01); *G09G 2360/18* (2013.01); *G09G 2370/047* (2013.01); *G09G 2370/10* (2013.01)

(58) Field of Classification Search
CPC ......... G09G 2370/047; G09G 2370/10; G09G 5/006; G09G 5/008; G09G 5/12
See application file for complete search history.

(56) References Cited

U.S. PATENT DOCUMENTS

| | | | |
|---|---|---|---|
| 8,117,481 B2 | 2/2012 | Anselmi et al. | |
| 8,732,376 B2* | 5/2014 | Saitoh | G06F 3/041 345/173 |
| 8,767,777 B2* | 7/2014 | Kobayashi | G06F 3/14 370/276 |
| 2009/0196209 A1* | 8/2009 | Haartsen | H04W 52/0216 370/311 |
| 2010/0073574 A1* | 3/2010 | Nakajima | G06F 3/14 348/723 |
| 2011/0292059 A1 | 12/2011 | Kobayashi | |
| 2011/0299512 A1* | 12/2011 | Fukuda | G06F 1/163 370/338 |
| 2012/0249563 A1* | 10/2012 | Wyatt | G09G 5/36 345/522 |
| 2012/0317607 A1* | 12/2012 | Wyatt | G09G 5/006 725/127 |
| 2013/0021352 A1* | 1/2013 | Wyatt | G09G 5/395 345/520 |
| 2014/0173320 A1 | 6/2014 | Tripathi | |

OTHER PUBLICATIONS

Embedded DisplayPort, "The New Generation Digital Display for Embedded Applications", Craig Wiley, Dec. 6, 2010, pp. 1-30.

* cited by examiner

MAINTAINING SYNCHRONIZATION DURING VERTICAL BLANKING

PRIORITY INFORMATION

This application is a continuation of U.S. patent application Ser. No. 13/717,978, entitled "MAINTAINING SYNCHRONIZATION DURING VERTICAL BLANKING," filed Dec. 18, 2012, which will issue on Aug. 25, 2015, as U.S. Pat. No. 9,116,639, which is hereby incorporated by reference in its entirety as though fully and completely set forth herein.

BACKGROUND

Technical Field

This invention is related to the field of processor communication, and more particularly to the implementation of display port interfaces between processors.

Description of the Related Art

Display technology for computer systems continues to evolve. From the first Cathode Ray tubes (CRTs), new display technologies have emerged including Liquid Crystal Display (LCD), Light Emitting Diode (LED), Eletroluminescent Display (ELD), Plasma Display Panel (PDP), Liquid Crystal on Silicon (LCoS), for example. Additionally, computer systems may employ multiple displays, projectors, televisions, and other suitable display devices.

To support the growing number of display technologies and the need to connect to multiple displays, interface technologies between processors and displays have developed into complex systems that may support platform-independent operation, networked operation, "plug and play" connections, and the like. Additionally, new interface technologies, such as, e.g., High-Definition Multimedia Interface (HDMI), Video Graphics Array (VGA), Digital Visual Interface (DVI), or Embedded Display Port (eDP), may need to support legacy display types. In some cases, newer interface technologies may exploit the support for legacy display types by transmitting secondary data during time intervals, which are not utilized by legacy devices.

SUMMARY OF THE EMBODIMENTS

Various embodiments of an apparatus implementing a display port interface are disclosed. Broadly speaking, an apparatus and a method are contemplated in which a source processor and sink processor are coupled through an interface. The interface may include a primary link, an auxiliary link, and a hot plug detect link. The source processor may send a wake-up command to the sink processor over the auxiliary link. A plurality of initialization parameters may also be sent from the source processor to the sink processor over the primary link. The source processor may then send a synchronization signal to the sink processor. A sleep command may then be sent by the source processor to the sink processor in response to the sending of the synchronization signal. The initialization parameters may include parameters related to clock data recovery and an idle period.

In one embodiment, the wake-up command may include multiple parts. The wake-up command may include a preamble, a wake with frequency change command, and a stop indicator.

In a further embodiment, the sink processor is configured to synchronize an internal timing circuit to an external timing reference. The synchronization may be dependent on the synchronization signal.

BRIEF DESCRIPTION OF THE DRAWINGS

The following detailed description makes reference to the accompanying drawings, which are now briefly described.

Figure 1:
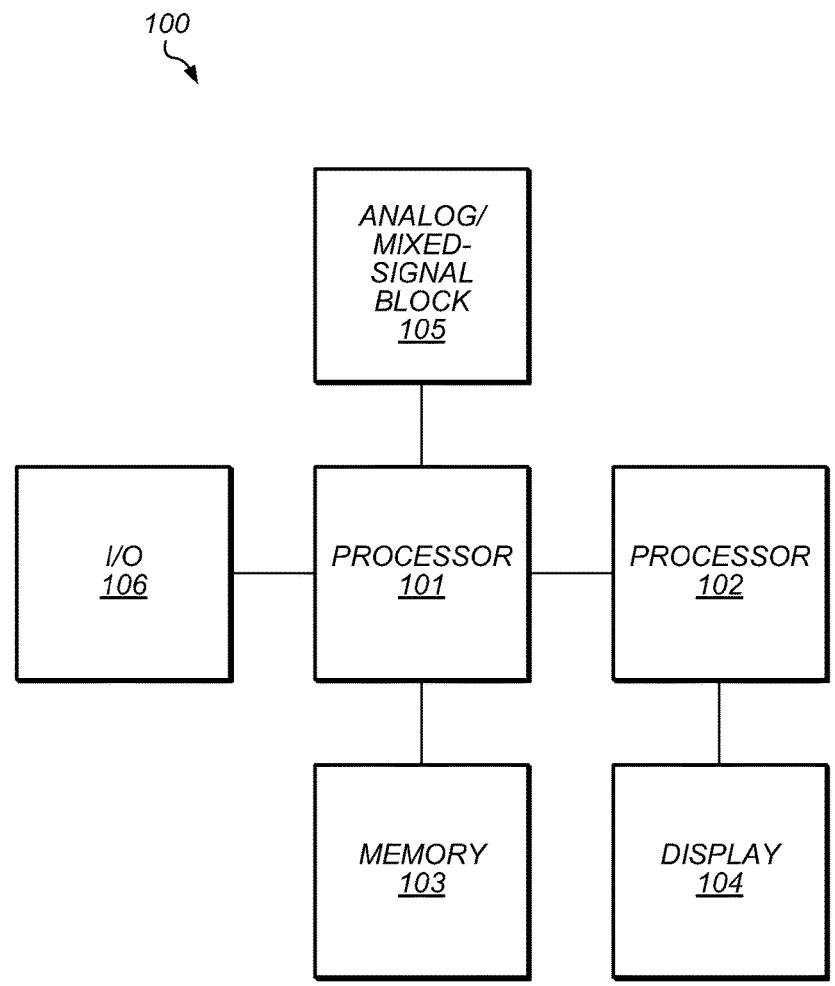
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A computer system may include one or more functional blocks, such as, e.g., processors, memories, etc., coupled to a display. A dedicated processor or display controller may be coupled directly to the display and may control the flow of graphics data to the display from other processors within the computer system. Multiple displays with respective display controllers may be employed in some computer systems.

Specialized interfaces may be employed between processors and display controllers within a computer system. The interfaces may support multiple display types, and multiple numbers of display controllers and processors. Moreover, the interfaces may have modes of operation, which may allow for reduced power operation of the interface, and transmission of initialization or operation parameters from a processor to a display controller.

Computer System Overview

A block diagram of a computer system is illustrated in FIG. 1. In computer system 100, processor 101 is coupled to memory block 103, analog/mixed signal block 105, I/O block 106, and to processor 102. Processor 102 is further coupled to display 104. In various embodiments, computer system 100 may be configured for use in mobile computing applications such as, e.g., a tablet, a laptop computer or a cellular telephone.

Processors 101 and 102 may, in various embodiments, be representative of general-purpose processors that perform computational operations. For example, processors 101 and 102 may be central processing units (CPU) such as a microprocessor, microcontrollers, application-specific integrated circuits (ASICs), or field-programmable gate arrays (FPGAs). In some embodiments, processors 101 and 102 may implement any suitable instruction set architecture (ISA), such as, e.g., the ARM™, PowerPC™, or x28 ISAs, or a combination thereof.

Memory block 103 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH Memory, or a Ferroelectric Random Access Memory (FeRAM), for example. It is noted that in the embodiment of a computer system illustrated in FIG. 1, a single memory block is depicted. In other embodiments, any suitable number of memory blocks may be employed.

Analog/mixed-signal block 105 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 105 may be configured to perform power management tasks with the inclusion of on-chip power supplies and voltage regulators. Analog/mixed-signal block 105 may also include, in some embodiments, radio frequency (RF) circuits that may be configured for operation with cellular telephone networks.

I/O block 106 may be configured to coordinate data transfer between processor 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 106 may be configured to implement a version of Universal Serial Bus (USB) protocol or IEEE 1394 (Firewire®) protocol.

I/O block 106 may also be configured to coordinate data transfer between processor 101 and one or more devices (e.g., other computer systems or system-on-chips) coupled to processor 101 via a network. In one embodiment, I/O block 106 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 106 may be configured to implement multiple discrete network interface ports.

Display element 104 may include any suitable type of display such as a Liquid Crystal Display (LCD), Light Emitting Diode (LED), Eletroluminescent Display (ELD), Cathode Ray Tube (CRT), Plasma Display Panel (PDP), Liquid Crystal on Silicon (LCoS), for example. Although a single display element is shown in the embodiment of a computer system illustrated in FIG. 1, in other embodiments, any suitable number of display elements may be employed.

Figure 2:
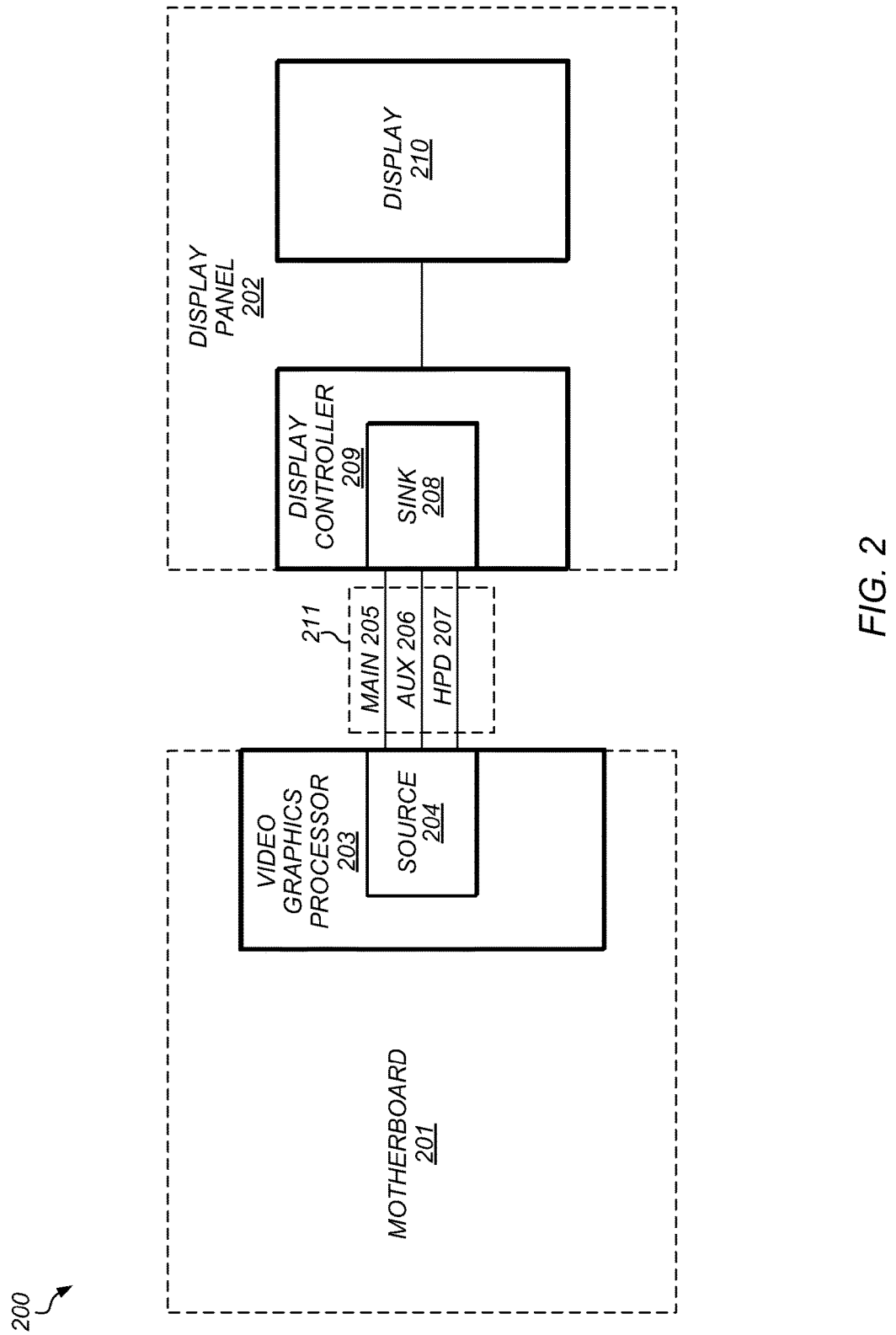
FIG. 2 illustrates another embodiment of a computing system.

Turning to FIG. 2, another embodiment of a computer system is illustrated. In computer system 200, motherboard 201 is coupled to display panel 202 through display port 211. Motherboard 201 includes video processor 203, and display panel 202 includes display controller 209 and display 210. In some embodiments, video processor 203 may correspond to processor 101 of computer system 100 as illustrated in FIG. 1, and display controller 209 may correspond to processor 102 of computer system 100 as illustrated in FIG. 1.

Video processor 203 includes display port source physical layer (PHY) 204, and display controller 209 includes display port sink PHY 208. In various embodiments, display port source PHY and display port sink PHY may implement any suitable display interface standard such as, High-Definition Multimedia Interface (HDMI), Video Graphics Array (VGA), Digital Visual Interface (DVI), or Embedded Display Port (eDP), for example.

Video processor 203 and display controller 209 may be implemented as dedicated processing devices. In various other embodiments, video processor 203 and display controller 209 may be implements as general purpose processors that are configured to executed program instructions stored in memory, such as memory block 103 of computer system 100 as illustrated in FIG. 1.

Display port 211 includes main link 255, auxiliary link 206, and hot plug detect (HPD) link 207. As described below in more detail with reference to FIG. 3 and FIG. 4, data may be transmitted from display port source PHY 204 to display port sink PHY 208 using main link 205. Auxiliary link 206 may be used by either display port source PHY 204 or display port sink PHY 208 to transmit command signals. HPD link 207 may be used by display port source PHY 204 to detect the presence of display panel 202. In various embodiments, bias resistors (not shown) may be coupled to HPD link 207, and display port sink PHY 208 may include a pull-up device or a pull-down device coupled to HPD link 207 and configured to charge or discharge HPD link 207 to achieve the desired logic level. Any pull-up device or pull-down device may include one or more metal-oxide field-effect transistors (MOSFETs).

In some embodiments, main link 205 may include a data bus, consisting of multiple signal lines, that is configured to employ a clock data recovery (CDR) methodology. For example, data may be sent from source PHY 204 to sink PHY 208 without an accompanying clock signal. Sink PHY 208 may generate a clock signal based on an approximate frequency reference. The generated clock may then be phase aligned to transitions in the transmitted data using a phase-locked loop (PLL) or any other suitable phase detection circuitry.

In order to correct for drift in frequency of the PLL's oscillator, the transmitted data must contain a sufficient number of transitions to align the generated clock. The transmitted data may be encoded to ensure sufficient transitions. In some embodiments, the transmitted data may be encoded using 8B/10B, Manchester, or any other suitable type of encoding method. Although CDR was described above in the context of main link 205, in various embodiments, all or part of the CDR method may be employed on auxiliary link 206 as well.

It is noted that "low" or "low logic level" refers to a voltage at or near ground and that "high" or "high logic level" refers to a voltage sufficiently large to turn on an re-channel MOSFET and turn off a p-channel MOSFET. In other embodiments, different technology may results in different voltage levels for "low" and "high."

It is noted that the computer system illustrated in FIG. 2 is merely an example. In other embodiments, different numbers of functional blocks and links, and different arrangements of functional blocks are possible and contemplated.

Display Port Operation

Figure 3:
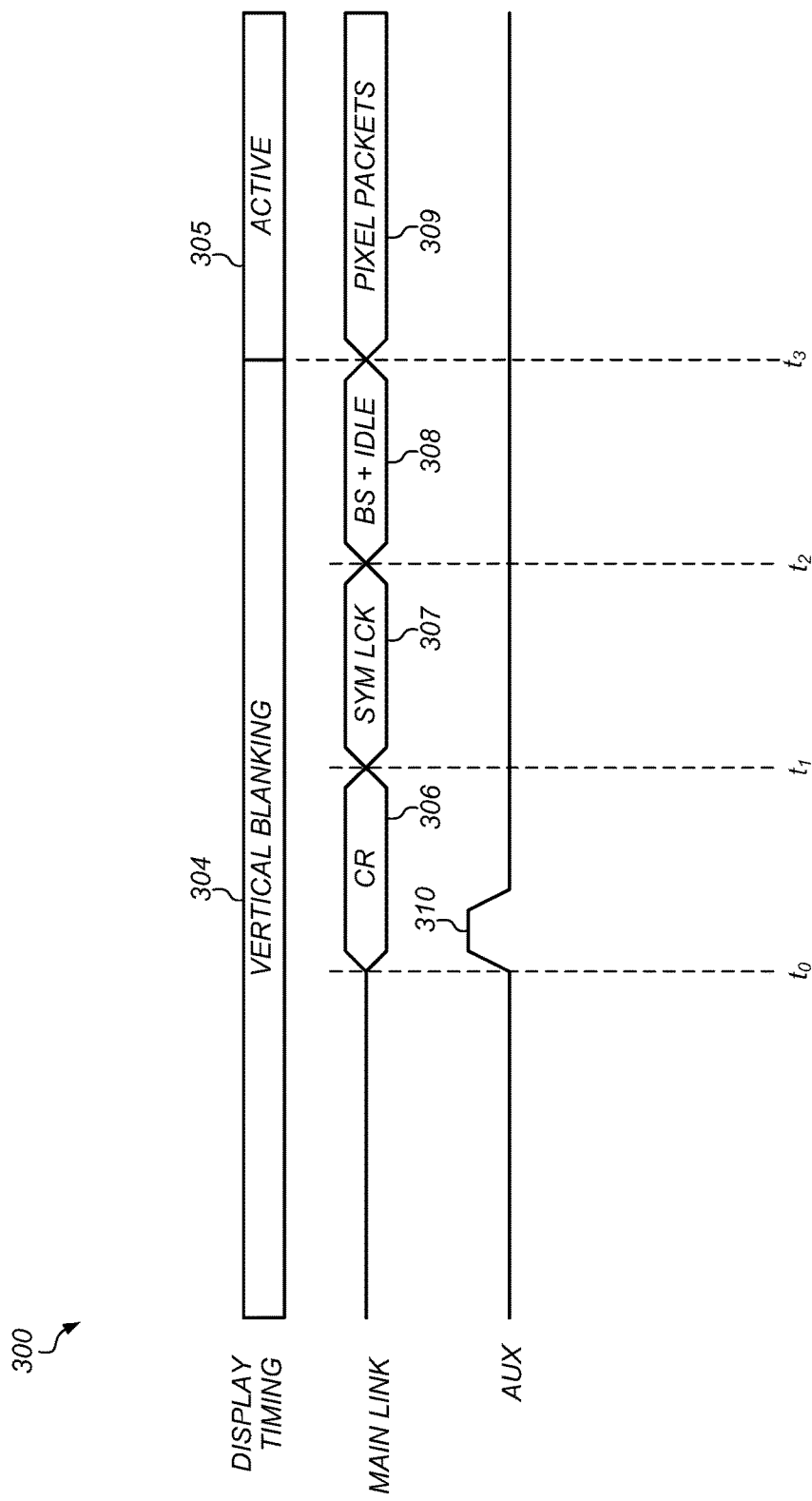
FIG. 3 depicts example waveforms illustrating an embodiment of a wake-up procedure.

Example waveforms depicting the operation of a display port are illustrated in FIG. 3. Referring collectively to the computer system 200 illustrated in FIG. 2, and waveforms 300, display port 211 may be in a sleep mode prior to time $t_0$. During this time, display 210 may be in a period of vertical blanking and main link 205 may be inactive.

At time $t_0$, source PHY 204 transmits wake-up command 310 on auxiliary link 206 to sink PHY 208. Wake-up command 310 may include an indication that the frequency on main link 205 has changed and that clock recovery and lock may need to be performed. It is noted that in various embodiments, wake-up command 310 may be encoded using 8B/10B, Manchester-II, or any other suitable encoding method. Source PHY 204 also transmits operation parameter CR 306 on main link 205. In some embodiments, operation parameter CR 306 may contain a number of clock recovery symbols to be used in sink PHY 208 to recover a clock from transmitted data.

Once operation parameter CR 306 has been transmitted, source PHY 204 transmits operation parameter symbol lock 307 at time $t_1$. In some embodiments, symbol lock 307 may include the number of training pattern symbols required for sink PHY 208 to achieve symbol lock. The training pattern symbols may include TPS2 or TPS3 as defined in the Embedded DisplayPort (eDP) specification.

With the conclusion of the transmission of symbol lock 307, source PHY 204 then transmits at time $t_2$, operation parameter BS & Idle 308. In some embodiments, BS & Idle 308 may include a number of lines before display 210 goes active. The lines sent to display 210 may include a blanking start framing symbol, or any other suitable framing symbol that may be sent to display 210 during an inactive period.

At time $t_3$, source PHY 204 begins transmission of pixel packets 309. The transmission of pixel packets may continue until another blanking period is initiated. The pixel packets may include packets relating to number of pixels in a horizontal line, the total number of lines in a video frame, horizontal and vertical synchronization widths, in addition to actual video data.

The waveforms and operation illustrated in FIG. 3 are merely an example. In other embodiments, different commands and different orders of commands are possible.

Figure 4:
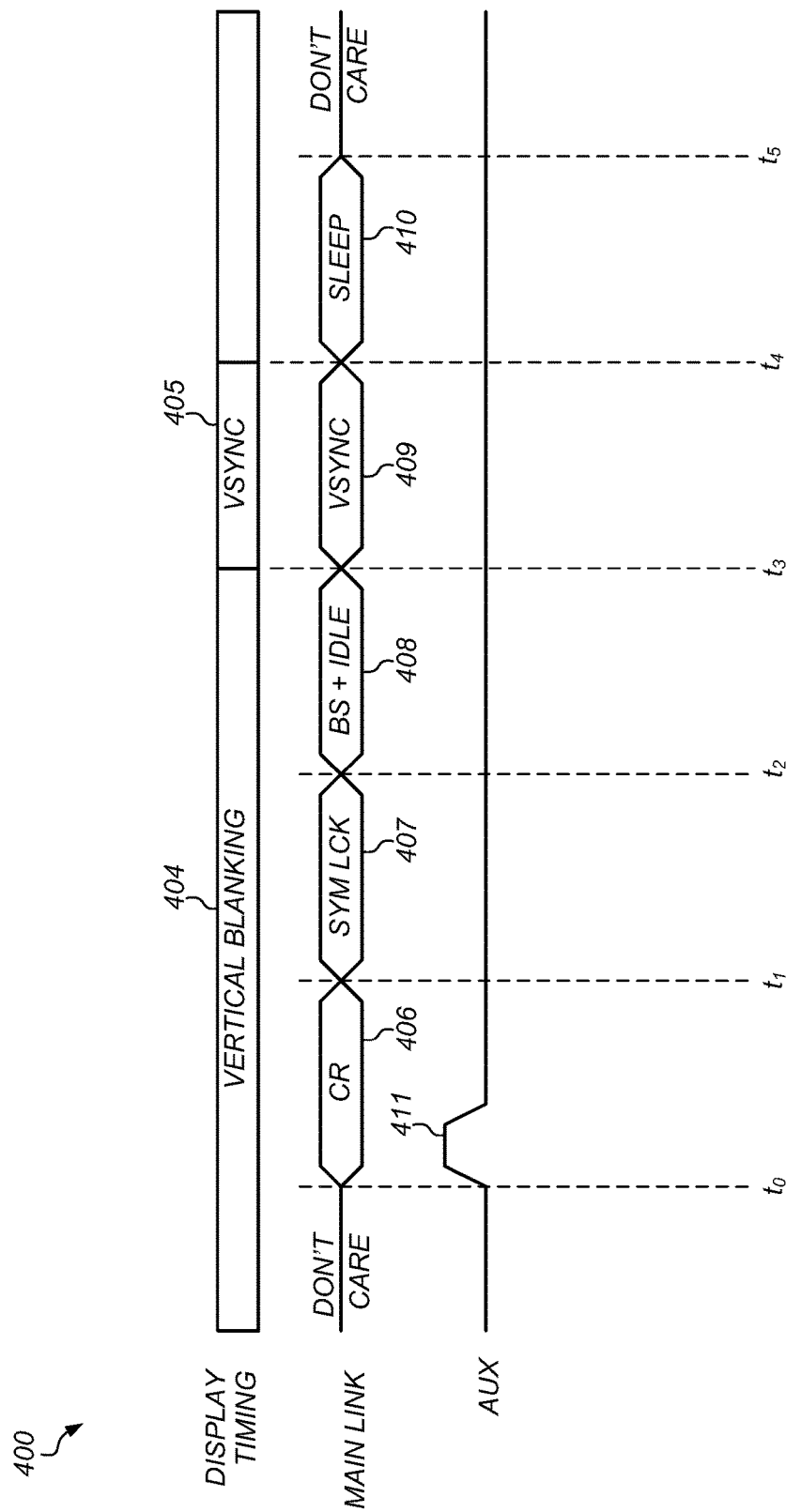
FIG. 4 depicts example waveforms illustrating another embodiment of a wake-up procedure.

Waveforms depicting the wake-up operation of a display port are illustrated in FIG. 4. Referring collectively to computer system 200 illustrated in FIG. 2 and waveforms 400, display port 211 may be in a sleep mode and display 210 may be in a horizontal or vertical blanking mode prior to time $t_0$. In some embodiments, during the period of time prior to time $t_0$, display 210 may in a self-refresh mode (commonly referred to as "panel self-refresh" or "PSR") during which display controller 209 may rely on an internal PLL or other suitable timing reference circuit to send data to display 210. Prior to time $t_0$, the logical state of main link 205 may be a logical-1, a logical-0, or a high impedance state. When the state of a signal can be any allowable logic level, the value of the signal is commonly referred to as a "don't care."

At time $t_0$, source PHY 204 may issue wake-up command 411 via auxiliary link 206. Wake-up command 411 may, in some embodiments, instruct sink PHY 208 to end a sleep or reduced power mode and enable receivers coupled to main link 205. In various embodiments, wake-up command 411 may be encoded using 8B/10B, Manchester-II, or any other suitable encoding method. Source PHY 204 may also transmits initialization parameter CR 406 on main link 205. In some embodiments, operation parameter CR 406 may contain a number of clock recovery symbols to be used in sink PHY 208 to recover a clock from transmitted data.

Once operation parameter CR 406 has been transmitted, source PHY 204 transmits initialization parameter symbol lock 407 at time $t_1$. In some embodiments, symbol lock 407 may include the number of training pattern symbols required for sink PHY 208 to achieve symbol lock. The training pattern symbols may include TPS2 or TPS3 as defined in the Embedded DisplayPort (eDP) specification, or any other suitable training pattern.

With the conclusion of the transmission of symbol lock 407, source PHY 204 then transmits at time $t_2$, initialization parameter BS & Idle 408. In some embodiments, BS & Idle 408 may include a number of lines before display 210 goes active. The lines sent to display 210 may include a blanking start framing symbol, or any other suitable framing symbol that may be sent to display 210 during an inactive period.

As described above, during the period prior to time $t_0$, display controller 209 and display 210 may be performing self-refresh. While performing self-refresh, the timing reference of display controller 209 may loose synchronization with the timing reference of video processor 203. When self-refresh mode is exited, visual artifacts (commonly referred to as "display tearing" or "screen tearing") may be visible on display 210 due to the difference between the two aforementioned timing references. In some embodiments, synchronization signals may be sent between video processor 203 and display controller 209 to reduce differences between the timing references of the two components.

At time $t_4$, source PHY 204 may transmit synchronization signal 409. In some embodiments, synchronization signal 409 may a vertical synchronization signal that may be used to synchronize a PLL or other timing reference circuit in display controller 209 to the timing reference within graphics processor 203. During vertical synchronization, display controller 209 may not send new graphics data to display 210 until the active refresh of display 210 is complete.

Once the transmission of synchronization signal 409 is complete, source PHY 204 may transmit sleep command 410. In some embodiments, sleep command 410 may signal to sink PHY 208 to power-down input receivers associated with main link 205 to conserve power. Display 210 may remain in PSR or may also enter a reduced power mode. Once sink PHY 208 has entered a reduced power state, the logical state of main link 205 may be a logical "don't care."

The waveforms and operation illustrated in FIG. 4 are merely an example. In other embodiments, the wake-up operation may include different command or different numbers of commands, and different initialization or operational parameters may be employed.

Figure 5:
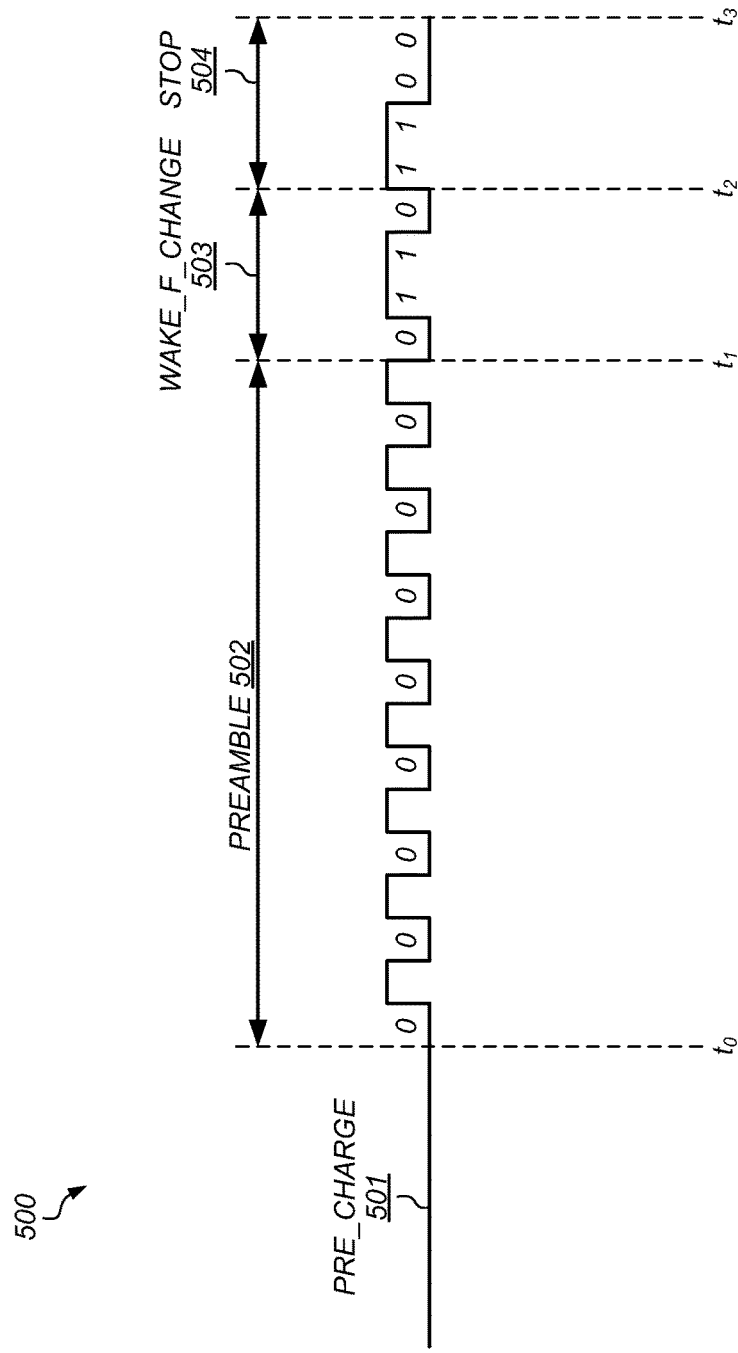
FIG. 5 depicts an example waveform illustrating a wake-up command.

Turning to FIG. 5, an example wake-up command is illustrated. In some embodiments, the wake-up command depicted in FIG. 5 may correspond to wake-up command 310 as illustrated in FIG. 3 or wake-up command 411 as illustrated in FIG. 4, and may be transmitted by a source PHY coupled to a display interface. Command 500 may be transmitted on an auxiliary link such as, auxiliary link 206 of display port 211 as illustrated in FIG. 2, for example, and may consist of one or more parts.

Prior to the beginning of the transmission of the command at time $t_0$, the link may be pre-charged. In various embodiments, the link may be pre-charged to the power supply voltage, to a ground level, or to any suitable pre-charge voltage level. At time $t_0$, the transmission of PREAMBLE 502 begins. In the illustrated embodiment, PREAMBLE 502 consists of eight consecutive logical-0 values (low logic levels), although in other embodiments, any suitable combination of logical-1 values and logical-0 values may be employed.

Once the transmission of the preamble is complete at time $t_1$, the transmission of WAKE_F_CHANGE 503 begins. In command 500, WAKE_F_CHANGE 503 includes a sequence of a logical-0 value followed by two logical-1 values, and a concluding logical-0 value. In various embodiments, different combinations of logical-0 values and logical-1 values may be employed to implement the WAKE_F_CHANGE command. The WAKE_F_COMMAND may, in some embodiments, indicate that the frequency on a primary link such as, e.g., main link 205 as illustrated in FIG. 2, has changed.

At time $t_2$, the transmission of WAKE_F_CHANGE 503 concludes, and the transmission of STOP 504 begins. STOP 504 includes a sequence of two logical-1 values followed by two logical-0 values, although other combinations of logical values may be employed in different embodiments. Once the transmission of STOP 504 concludes at time $t_3$, the transmission of command 500 is complete.

It is noted that the command illustrated in FIG. 5 is merely an example. In other embodiments, different combinations of logical values and different command parts may be employed.

Figure 6:
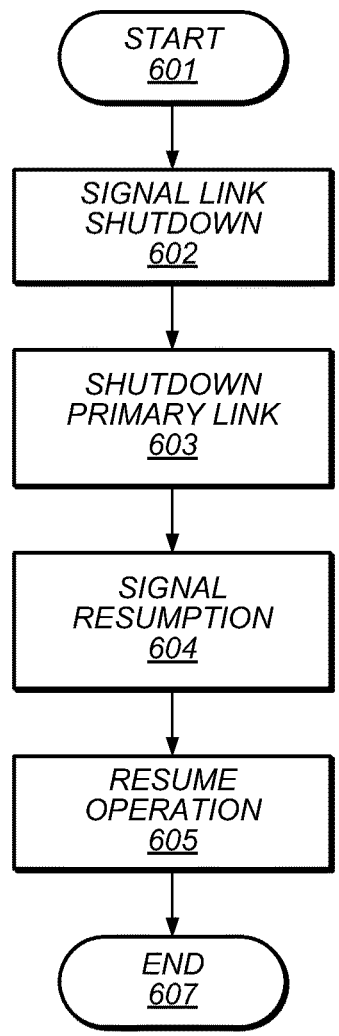
FIG. 6 depicts a flowchart illustrating a method of a sleep and wake-up procedure.

A flowchart illustrating a method of operating a display port such as, e.g., display port 211 as illustrated in FIG. 2, is depicted in FIG. 6. The method begins in block 601. A termination of operation of the display port is then signaled from a display port source to a display port sink in block 602. The termination of operation may be in order to enter a power savings mode. In some embodiments, the termination may be specific to a main or primary link of the display port, such as, main link 205 of display port 211 as depicted in FIG. 2. The signal of termination of operation may be transmitted on either a primary or auxiliary link of the display port.

The operation of a primary link may then be terminated in block 603. In various embodiments, the termination may include the cessation of a portion of the primary link's operational capabilities. All of the operational capabilities of the primary link may be ceased in other embodiments.

In block 604, the display port source transmits a signal to the display port sink to resume operation. In some embodiments, the signal to resume operation may be sent using an auxiliary link of the display port. The signal to resume operation may include multiple parts such as, e.g., command 500 as illustrated in FIG. 5. In various embodiments, additional commands or operational parameters, such as, a number of clock recovery symbols for clock data recovery, may be sent from the display port source to the display port sink before the transmission of data can resume. Such commands and parameters, such as those described above in reference to FIG. 3 and FIG. 4 may be sent via the primary link of the display port before the resumption of data transmission.

Once any additional command or operational parameters have been transmitted, normal operation of the display port may resume with the transmission of data (block 606). The method then concludes in block 607. Although the various operations depicted in the method illustrated in FIG. 6 are shown as being performed in a sequential fashion, in other embodiments, one or more of the operations may be performed in parallel.

Figure 7:
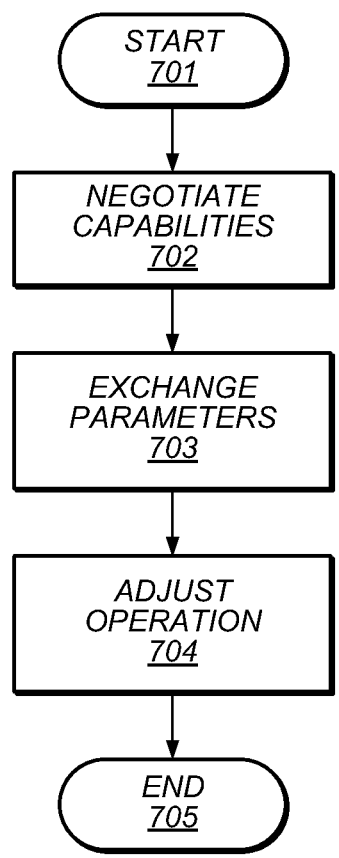
FIG. 7 depicts a flowchart illustrating a method training a link.

Referring to FIG. 7, an example method of adjusting operation of a plurality of components through an interface is illustrated. The method begins in block 701. The components connected through the interface then negotiate one or more component capabilities (block 702). In some embodiments, the negotiation may involve each of the plurality of components identifying each other as being compliant with an interface standard, such as, eDP, for example.

Once the negotiation is complete, the components may exchange one or more parameters (block 703). The exchanged parameters may include settings that govern the operation of the components, such as a data rate setting, or transceiver settings, for example. The operation of the components is then adjusted based upon the exchanged parameters (block 704). In various embodiments, the components may adjust their respective transceivers to adopt the data rate received during the exchange of parameters. Power consumption mode settings may also be adjusted in response to exchanged parameters.

The method illustrated in FIG. 7 is merely an example. In other embodiments, different operations or different orders of operation are possible.

Figure 8:
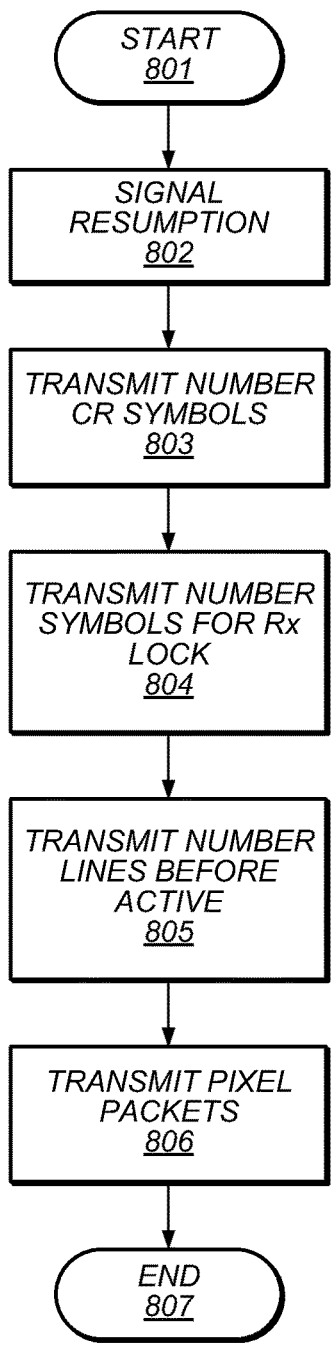
FIG. 8 depicts a flowchart illustrating a method of adjusting changing a link clock frequency.

Turning to FIG. 8, a method of changing link clock frequency of a display port during a sleep or standby period is illustrated. The method begins in block 801 with the display port in a sleep or standby mode. A signal to resume operation may then be sent by the display port source to the display port sink (block 802). In some embodiments, the signal to resume operation may be sent via an auxiliary link of the display port.

Once the signal to resume operation has been transmitted, the display port source then sends a parameter to govern clock recovery of a new clock frequency (block 803). The parameter may include, in some embodiments, a number of clock recovery symbols necessary to perform clock data recovery.

The display port source may then send a number of symbols required for training of the link (block 804). In some embodiments, the symbols used for training may be specialized training symbols such as TPS2 or TPS3 as defined in the Embedded DisplayPort (eDP) specification. In other embodiments, any suitable training symbol pattern may be employed.

An idle parameter may then be sent from display port source (block 805). In some embodiments, the idle parameter may include a number of lines before resumption of active operation of a display coupled to the display port sink. The number of lines may, in various embodiments, refer to a number of framing symbols such as, e.g., the blanking start (BS) framing symbol as defined in the Embedded DisplayPort (eDP) specification.

With the completion of the transmission of the idle parameter, the display port source may then transmit pixel or graphics data to the display port sink (block 806). In some embodiments, the pixel or graphics data may include video data from one or more video sources such as, a Digital Versatile Disc (DVD), for example. The method then concludes (block 807). It is noted that the method illustrated in FIG. 8 is merely an example. In other embodiments, different operations and different orders of operations are possible and contemplated.

Figure 9:
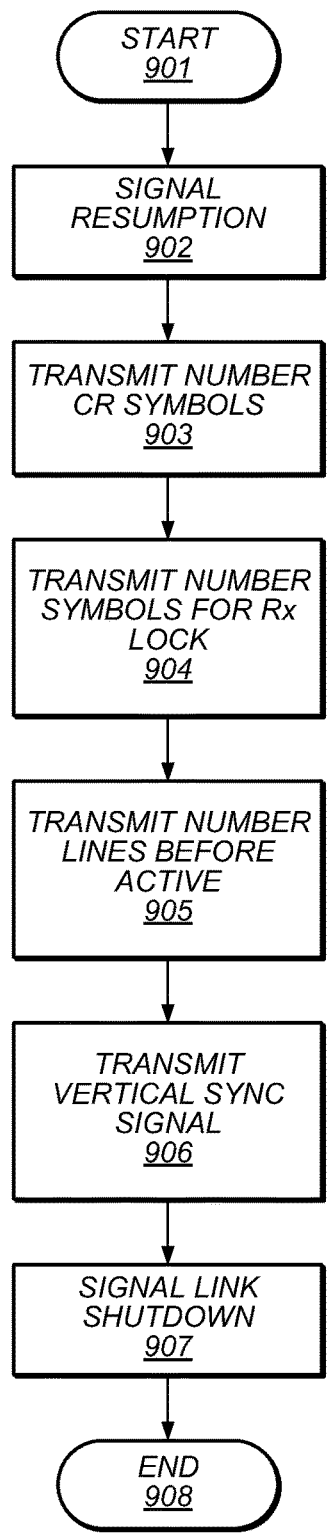
FIG. 9 depicts a flowchart illustrating a method of maintaining vertical synchronization.

A method for maintaining vertical synchronization on a display is illustrated in FIG. 9. The method begins in block 901 with a display port interface between a processor and a display controller in a sleep or low-power mode. During this time, the display controller and its associated display may be performing self-refresh. A signal to resume operation may then be sent by the processor to the display controller (block 902). In some embodiments, the signal to resume operation may be sent via an auxiliary link of the display port interface.

Once the signal to resume operation has been transmitted, the processor may then send a parameter to govern clock recovery by the display controller of a new clock frequency (block 903). The parameter may include, in some embodiments, a number of clock recovery symbols necessary to perform clock data recovery, and may be transmitted on a primary link of the display port interface. In other embodiments, the clock frequency may not change from a previous active period of the display port interface.

The processor may then send a number of symbols required for training of the link (block 904). In some embodiments, the symbols used for training may be specialized training symbols such as TPS2 or TPS3 as defined in the Embedded DisplayPort (eDP) specification, and may be sent on the primary link of the display port interface. In other embodiments, any suitable training symbol pattern may be employed to train the display port interface.

An idle parameter may then be sent from processor (block 905). In some embodiments, the idle parameter may include a number of lines before resumption of active operation of a display coupled to the display port sink. The number of lines may, in various embodiments, refer to a number of framing symbols such as, e.g., the blanking start (BS) framing symbol as defined in the Embedded DisplayPort (eDP) specification. In some embodiments, the idle parameter may be transmitted on the primary link of the display port interface.

With the completion of the transmission of the idle parameter, the processor may then send a synchronization signal to the display controller (block 906). In some embodiments, the synchronization signal may be a vertical synchronization signal, and may be employed by the display controller to adjust the phase and/or frequency of a timing reference circuit such as a PLL, for example. The phase and/or frequency of the timing circuit may be adjusted to match the phase and/or frequency of a timing reference circuit within the processor such as, e.g., a PLL or crystal oscillator.

Once the synchronization signal has been transmitted, the processor may then send a sleep or shutdown signal (block 907). In some embodiments, the sleep or shutdown signal may be sent on the primary link of the display port interface, and may signal the display controller to power-down receivers coupled to the primary link of the display port interface. The display controller and its associated display may remain in self-refresh mode after the receipt of the sleep or shutdown signal by the display controller. The method then concludes in block 907.

It is noted that the operations depicted in the method illustrated in FIG. 9 are shown as being performed sequentially. In other embodiments, all or some of the operations may be performed in parallel.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a source processor configured to transmit data via a primary link; and
   a sink processor coupled to the source processor via the primary link and a secondary link, wherein the sink processor is configured to receive the data via the primary link;
   wherein the source processor is further configured to:
      in response to a determination that operation of the primary link has been terminated:
         pre-charge the secondary link to a particular voltage level;
         send a signal to resume operation on the primary link to the sink processor, the signal including a preamble followed by a link clock frequency change command, wherein the preamble includes a number of consecutive logic values; and
         send at least one clock recovery parameter to the sink processor.

2. The apparatus of claim 1, wherein the at least one clock recovery parameter includes a number of clock recovery symbols to perform clock data recovery.

3. The apparatus of claim 2, wherein the source processor is further configured to send the at least one clock recovery parameter via the primary link.

4. The apparatus of claim 1, wherein the source processor is further configured to send the signal to resume operation via the secondary link.

5. The apparatus of claim 1, wherein the source processor is further configured to send, to the sink processor, a number of symbols to use in training the primary link.

6. The apparatus of claim 5, wherein the source processor is further configured to send a number of lines to wait before resuming operation to the sink processor.

7. A method, comprising:
   in response to determining that operation of a primary link between a first processor and a second processor has been terminated, wherein the second processor is coupled to a display:
      pre-charging an auxiliary link between the first and second processors to a particular voltage level;
      sending a signal to resume operation on the primary link from the first processor to the second processor, wherein the signal to resume operation includes a preamble followed by a link clock frequency change command, and wherein the preamble includes a number of consecutive logic values; and
      sending, by the first processor, at least one clock recovery parameter to the second processor.

8. The method of claim 7, wherein the at least one clock recovery parameter includes a number of clock recovery symbols to perform clock data recovery.

9. The method of claim 7, further comprising sending the at least one clock recovery parameter via the primary link.

10. The method of claim 7, further comprising sending the signal to resume operation from the first processor to the second processor via the auxiliary link.

11. The method of claim 7, further comprising sending, by the first processor, a number of symbols to use in training to the primary link to the second processor.

12. The method of claim 7, further comprising sending, by the first processor, a number of lines to wait before resuming operation to the second processor.

13. A system, comprising:
a memory;
a first processor coupled to the memory;
a second processor coupled to the first processor via an interface, wherein the interface includes a primary link and a auxiliary link;
a display coupled to the second processor;
wherein the first processor is configured to:
  in response to a determination that operation of the primary link has been terminated:
    pre-charge the auxiliary link to a particular voltage level;
    send a signal to resume operation to the second processor, the signal including a preamble followed by a link clock frequency change command, wherein the preamble includes a number of consecutive logic values; and
    send at least one clock recovery parameter to the second processor.

14. The system of claim 13, wherein the at least one clock recovery parameter includes a number of clock recovery symbols to perform clock data recovery.

15. The system of claim 13, wherein the first processor is further configured to send the at least one clock recovery parameter via the primary link.

16. The system of claim 13, wherein the first processor is further configured to send the signal to resume operation via the auxiliary link.

17. The system of claim 13, wherein the first processor is further configured to send, to the second processor, a number of symbols to use in training the primary link.

18. The system of claim 17, wherein the first processor is further configured to send a number of lines to wait before resuming operation to the second processor.

* * * * *